US008153564B2

(12) United States Patent
Putzig

(10) Patent No.: US 8,153,564 B2
(45) Date of Patent: Apr. 10, 2012

(54) ZIRCONIUM-BASED CROSS-LINKING COMPOSITION FOR USE WITH HIGH PH POLYMER SOLUTIONS

(75) Inventor: Donald Edward Putzig, Newark, DE (US)

(73) Assignee: Dorf Ketal Speciality Catalysts, LLC, Stafford, TX (US)

( * ) Notice: Subject to any disclaimer, the term of this patent is extended or adjusted under 35 U.S.C. 154(b) by 205 days.

(21) Appl. No.: 12/074,953

(22) Filed: Mar. 7, 2008

(65) Prior Publication Data

US 2009/0227479 A1 Sep. 10, 2009

(51) Int. Cl.
*C23F 11/18* (2006.01)
*C09K 8/68* (2006.01)
*C09K 8/60* (2006.01)
(52) U.S. Cl. .............. 507/271; 507/211; 507/219
(58) Field of Classification Search .................. 507/271, 507/211, 219, 244
See application file for complete search history.

(56) References Cited

U.S. PATENT DOCUMENTS

| | | |
|---|---|---|
| 2,824,114 A | 2/1958 | Bostwick |
| 2,824,115 A * | 2/1958 | Beacham et al. ............. 556/56 |
| 2,894,966 A * | 7/1959 | Russell .......................... 556/2 |
| 2,978,347 A | 4/1961 | Koehler et al. |
| 3,525,690 A | 8/1970 | Christian |
| 3,888,312 A | 6/1975 | Tiner et al. |
| 4,382,874 A | 5/1983 | Jenkins |
| 4,460,751 A | 7/1984 | Hanlon et al. |
| 4,477,360 A | 10/1984 | Almond |
| 4,488,975 A | 12/1984 | Almond |
| 4,524,829 A | 6/1985 | Hanlon et al. |
| 4,534,870 A | 8/1985 | Williams |
| 4,553,601 A | 11/1985 | Almond et al. |
| 4,578,488 A | 3/1986 | Rummo et al. |
| 4,579,670 A | 4/1986 | Payne |
| 4,657,081 A | 4/1987 | Hodge |
| 4,677,201 A * | 6/1987 | Morgan ....................... 536/114 |
| 4,683,068 A | 7/1987 | Kucera |
| 4,686,052 A | 8/1987 | Baranet et al. |
| 4,702,848 A | 10/1987 | Payne |
| 4,749,041 A | 6/1988 | Hodge |
| 4,797,216 A | 1/1989 | Hodge |
| 4,798,902 A | 1/1989 | Putzig |
| 4,883,605 A | 11/1989 | Putzig |
| 5,165,479 A | 11/1992 | Harris et al. |
| 5,217,632 A | 6/1993 | Sharif |
| 5,271,466 A | 12/1993 | Harms |
| 5,273,580 A | 12/1993 | Totten et al. |
| 5,305,832 A | 4/1994 | Gupta et al. |
| 5,462,683 A | 10/1995 | Kinoshita et al. |
| 5,466,846 A | 11/1995 | Sharif |
| 5,478,802 A | 12/1995 | Moradi-Araghi |
| 5,512,188 A | 4/1996 | Kinoshita et al. |
| 5,547,025 A | 8/1996 | Ahmed et al. |
| 5,558,161 A | 9/1996 | Vitthal et al. |
| 5,569,643 A | 10/1996 | Kinoshita et al. |
| 5,614,475 A | 3/1997 | Moorhouse et al. |
| 5,642,783 A | 7/1997 | Moradi-Araghi et al. |
| 5,650,633 A | 7/1997 | Ahmed et al. |
| 5,688,894 A | 11/1997 | Ridland |
| 5,708,107 A | 1/1998 | Ahmed et al. |
| 5,785,747 A | 7/1998 | Vollmer et al. |
| 5,789,350 A | 8/1998 | Moradi-Araghi et al. |
| 5,789,351 A | 8/1998 | Ahmed et al. |
| 5,798,320 A | 8/1998 | Dawson et al. |
| 5,849,674 A | 12/1998 | Fox et al. |
| 5,883,210 A | 3/1999 | Ahmed et al. |
| 5,922,653 A | 7/1999 | Ahmed et al. |
| 5,950,731 A | 9/1999 | Shuchart et al. |
| 6,051,670 A | 4/2000 | Ahmed et al. |
| 6,186,235 B1 | 2/2001 | Tjon-Joe-Pin et al. |
| 6,214,773 B1 | 4/2001 | Harris et al. |
| 6,333,423 B1 | 12/2001 | Kol et al. |
| 6,387,986 B1 | 5/2002 | Moradi-Araghi et al. |
| 6,454,008 B1 | 9/2002 | Chatterji et al. |
| 6,488,091 B1 | 12/2002 | Weaver et al. |
| 6,613,720 B1 | 9/2003 | Feraud et al. |
| 6,734,146 B2 | 5/2004 | Chatterji et al. |
| 6,737,386 B1 | 5/2004 | Moorhouse et al. |
| 6,793,018 B2 | 9/2004 | Dawson et al. |

(Continued)

FOREIGN PATENT DOCUMENTS

| | | |
|---|---|---|
| EP | 0138522 A2 | 4/1985 |
| EP | 0278684 A1 | 8/1988 |
| EP | 0 449 384 A1 | 10/1991 |
| EP | 0 558 099 B1 | 9/1993 |
| GB | 2108122 A | 5/1983 |
| JP | 2000264893 A | 9/2000 |
| WO | 2006010912 A1 | 2/2006 |
| WO | 2007095018 A2 | 8/2007 |
| WO | 2007095018 A3 | 8/2007 |
| WO | 2007095367 A2 | 8/2007 |
| WO | 2008082504 A1 | 7/2008 |
| WO | 2008121357 A1 | 10/2008 |

OTHER PUBLICATIONS

Technical Bulletin of BASF, www2.basf.us/urethanechemicals/kun_chemicals_case/pdfs/Quadrol.pdf, 2001.*

(Continued)

*Primary Examiner* — Timothy J. Kugel
*Assistant Examiner* — Aiqun Li
(74) *Attorney, Agent, or Firm* — Conley Rose, P.C.; Rodney B. Carroll

(57) ABSTRACT

A cross-linking composition comprising (a) an aqueous liquid; (b) a pH buffer; (c) a cross-linkable organic polymer; and (d) a solution of a zirconium cross-linking agent comprising the product of contacting a zirconium complex with an alkanolamine and ethylene glycol wherein the mole ratio of alkanolamine to zirconium is 2:1 to 4:1 and the mole ratio of ethylene glycol to zirconium is 1:1 to 10:1. Optionally, water, hydroxyalkylated ethylenediamine, or both are added to the zirconium complex. The cross-linking composition of this invention is useful in oil field applications, for example, for hydraulically fracturing a subterranean formation and for plugging permeable zones or leaks in a subterranean formation.

10 Claims, No Drawings

U.S. PATENT DOCUMENTS

| | | |
|---|---|---|
| 6,810,959 B1 | 11/2004 | Qu et al. |
| 6,814,145 B2 | 11/2004 | Maberry et al. |
| 6,818,598 B2 | 11/2004 | Maberry et al. |
| 6,918,445 B2 | 7/2005 | Todd et al. |
| 6,971,448 B2 | 12/2005 | Slabaugh et al. |
| 6,983,801 B2 | 1/2006 | Dawson et al. |
| 6,986,391 B2 | 1/2006 | Funkhouser et al. |
| 7,001,872 B2 | 2/2006 | Pyecroft et al. |
| 7,036,590 B2 | 5/2006 | Harris |
| 7,078,370 B2 | 7/2006 | Crews |
| 7,140,438 B2 | 11/2006 | Frost et al. |
| 7,151,076 B2 | 12/2006 | Qu et al. |
| 7,165,617 B2 | 1/2007 | Lord et al. |
| 7,195,065 B2 | 3/2007 | Kelly et al. |
| 7,276,466 B2 | 10/2007 | Todd et al. |
| 7,347,265 B2 | 3/2008 | Monroe et al. |
| 7,497,278 B2 | 3/2009 | Schriener et al. |
| 7,547,665 B2 | 6/2009 | Welton et al. |
| 7,730,952 B2 | 6/2010 | Putzig |
| 7,732,383 B2 | 6/2010 | Putzig |
| 7,795,187 B2 | 9/2010 | Putzig |
| 7,795,188 B2 | 9/2010 | Putzig |
| 2003/0092584 A1 | 5/2003 | Crews |
| 2003/0114539 A1 | 6/2003 | Weaver et al. |
| 2004/0238169 A1 | 12/2004 | Todd et al. |
| 2005/0137094 A1 | 6/2005 | Weaver et al. |
| 2005/0211435 A1 | 9/2005 | Monroe et al. |
| 2005/0215425 A1 | 9/2005 | Clair et al. |
| 2005/0269099 A1 | 12/2005 | Stegent et al. |
| 2005/0284637 A1 | 12/2005 | Stegent et al. |
| 2006/0009363 A1 | 1/2006 | Crews |
| 2006/0027364 A1 | 2/2006 | Kelly et al. |
| 2006/0030493 A1 | 2/2006 | Segura |
| 2006/0229213 A1 | 10/2006 | Harris et al. |
| 2006/0264334 A1 | 11/2006 | Gupta et al. |
| 2007/0187098 A1 | 8/2007 | Putzig |
| 2007/0187102 A1 | 8/2007 | Putzig |
| 2008/0149341 A1 | 6/2008 | Putzig |
| 2008/0242563 A1 | 10/2008 | Putzig |

OTHER PUBLICATIONS

Technical Bulletin of BASF, www2.basf.us/performancechemical/pdfs/Quadrol_Polyol.pdf, 2002.*

Office Action (Final) dated Oct. 11, 2011 (13 pages), U.S. Appl. No. 11/731,049, filed Mar. 30, 2007.

Advisory Action dated May 31, 2011 (3 pages), U.S. Appl. No. 11/643,513, filed Dec. 21, 2006.

BASF, Performance Chemicals, Aug. 23, 2010, 2 pages, BASF SE, available at www2.bastus/performancechemical/pdfs/Quadrol_Polyol.pdf.

Chaberek, Jr., et al., "Hydrolytic tendencies of metal chelate compounds. III. Oxometal Ions," Journal of the American Chemical Society, Feb. 5, 1959, vol. 81, pp. 515-519.

Foreign Communication from a related counterpart application—International Search Report, PCT/US2007/025802, Jun. 12, 2008, 5 pages.

Foreign Communication from a related counterpart application—International Search Report and Written Opinion, PCT/US2008/004123, Sep. 12, 2008, 7 pages.

Foreign Communication from a related counterpart application—International Preliminary Report on Patentability, PCT/US2008/004123, Oct. 6, 2009, 5 pages.

Office Action dated Feb. 27, 2009 (14 pages), U.S. Appl. No. 11/731,049, filed Mar. 30, 2007.

Office Action (Final) dated Oct. 7, 2009 (11 pages), U.S. Appl. No. 11/731,049, filed Mar. 30, 2007.

Office Action dated Feb. 5, 2010 (10 pages), U.S. Appl. No. 11/731,049, filed Mar. 30, 2007.

Office (Final) Action dated Oct. 18, 2010 (11 pages), U.S. Appl. No. 11/731,049, filed Mar. 30, 2007.

Office Action dated May 16, 2011 (20 pages), U.S. Appl. No. 11/731,049, filed Mar. 30, 2007.

Office Action dated Jun. 23, 2009 (17 pages), U.S. Appl. No. 11/643,513, filed Dec. 21, 2006.

Office Action (Final) dated Apr. 19, 2010 (15 pages), U.S. Appl. No. 11/643,513, filed Dec. 21, 2006.

Office Action dated Dec. 10, 2010 (10 pages), U.S. Appl. No. 11/643,513, filed Dec. 21, 2006.

Office Action (Final) dated Mar. 21, 2011 (20 pages), U.S. Appl. No. 11/643,513, filed Dec. 21, 2006.

Zhao, et al., "Zirconium gel water shutoff agent used in single fluid method," Shiyou Daxue Xuebao, Ziran Kexueban, 1996, vol. 20, No. 1, pp. 43-47, University of Petroleum, Dongying 257062, People's Republic of China.

Office Action dated Sep. 12, 2011 (14 pages), U.S. Appl. No. 11/643,513, filed Dec. 21, 2006.

* cited by examiner

ZIRCONIUM-BASED CROSS-LINKING COMPOSITION FOR USE WITH HIGH PH POLYMER SOLUTIONS

FIELD OF THE INVENTION

The present invention relates to zirconium chelate cross-linking agents and their use in oil field applications such as hydraulic fracturing and plugging of permeable zones.

BACKGROUND OF THE INVENTION

The production of oil and natural gas from an underground well (subterranean formation) can be stimulated by a technique called hydraulic fracturing, in which a viscous fluid composition (fracturing fluid) containing a suspended proppant (e.g., sand, bauxite) is introduced into an oil or gas well via a conduit, such as tubing or casing, at a flow rate and a pressure which create, reopen and/or extend a fracture into the oil- or gas-containing formation. The proppant is carried into the fracture by the fluid composition and prevents closure of the formation after pressure is released. Leak-off of the fluid composition into the formation is limited by the fluid viscosity of the composition. Fluid viscosity also permits suspension of the proppant in the composition during the fracturing operation. Cross-linking agents, such as borates, titanates or zirconates, are usually incorporated into the fluid composition to control viscosity.

Typically, less than one third of available oil is extracted from a well after it has been fractured before production rates decrease to a point at which recovery becomes uneconomical. Enhanced recovery of oil from such subterranean formations frequently involves attempting to displace the remaining crude oil with a driving fluid, e.g., gas, water, brine, steam, polymer solution, foam, or micellar solution. Ideally, such techniques (commonly called flooding techniques) provide a bank of oil of substantial depth being driven into a producing well; however, in practice this is frequently not the case. Oil-bearing strata are usually heterogeneous, some parts of them being more permeable than others. As a consequence, channeling frequently occurs, so that the driving fluid flows preferentially through permeable zones depleted of oil (so-called "thief zones") rather than through those parts of the strata which contain sufficient oil to make oil-recovery operations profitable.

Difficulties in oil recovery due to thief zones may be corrected by injecting an aqueous solution of an organic polymer and a cross-linking agent into a subterranean formation under conditions where the polymer will be cross-linked to produce a gel, thus reducing permeability of the subterranean formation to the driving fluid (gas, water, etc.). Polysaccharide- or partially hydrolyzed polyacrylamide-based fluids cross-linked with certain aluminum, titanium, zirconium, and boron based compounds are used in these enhanced oil recovery applications. Cross-linked fluids or gels, whether for fracturing a subterranean formation or for reducing permeability of zones in subterranean formation, are now being used in hotter and deeper wells under a variety of temperature and pH conditions. In these operations the rate of cross-linking is critical to the successful generation of viscosity. Frequently the rates of cross-linking with known cross-linking compositions are unacceptable, and new, highly specific compositions are required.

Commercially available zirconate cross-linkers, such as tetra-triethanolamine zirconate cross-link too fast under high pH (pH 10) conditions, causing a significant loss in viscosity due to shear degradation. Other zirconium complexes of tri-ethanolamine, such as those disclosed in U.S. Pat. Nos. 4,578,488, 4,683,068, and 4,686,052 can be used as cross-linking agents. However, these complexes also do not cross-link at a desirable rate, especially at high pH conditions, causing a similar loss in viscosity due to shear degradation.

U.S. patent application Ser. No. 11/643,120, filed Dec. 21, 2006, discloses addition of 1 to 20 moles of water per mole of zirconium to a triethanolamine zirconate complex under certain conditions forms a stable complex with a 3-8 minute cross-linking rate, while maintaining satisfactory viscosity development. These cross-linkers have been found desirable for high temperature operations (149-177° C., 300-350° F.) because of the high initial viscosity they develop, but may be too slow for low temperature operations (121-149° C., 250-300° F.) and/or may not generate sufficient initial viscosity.

U.S. Pat. No. 4,579,670 discloses a general method of controlling reaction rates in a water based polymer fracturing fluid using a mixture of cross-linker in combination with a cross-linking rate retarder at a ratio such that the cross-linking reaction rate is controlled. The cross-linker employs a transition metal such as titanium, zirconium, chromium or hafnium. Triethanolamine and ethylene glycol are cited as rate retarders.

A glycol may be used as part of a cross-linked fluid or gel, but not as part of the cross-linker itself. U.S. Pat. Appl. 2006/0027364 discloses a method of treating subterranean formations using an aqueous gelled fluid comprising an aqueous fluid, a cross-linked guar gelling agent and an amount of a glycol such as ethylene glycol effective to increase stability of the fluid as measured by its viscosity, typically an amount of about 1 to about 10 volume % glycol based on the aqueous fluid. The glycol is added to the already cross-linked composition. US Pat. Appl. 2006/0264334 discloses the use of polyols such as ethylene glycol as a solvent to dissolve polymers used in fracturing fluids, not as part of the cross-linker itself.

The need exists for a cross-linker which develops high initial viscosity and which possesses a desirable 3-8 minute rate of cross-linking rate over a broad temperature range (121-177° C., 250-350° F.) for use in high pH (about pH 10 and above) fracturing fluids. The present invention meets these needs.

SUMMARY OF THE INVENTION

This invention provides a cross-linking composition comprising (a) an aqueous liquid; (b) a pH buffer; (c) a cross-linkable organic polymer; and (d) a solution of a zirconium cross-linking agent comprising the product of contacting a zirconium complex with an alkanolamine and ethylene glycol wherein the mole ratio of alkanolamine to zirconium is 2:1 to 4:1 and the mole ratio of ethylene glycol to zirconium is 1:1 to 10:1. Optionally, the zirconium complex may further be contacted with water, hydroxyalkylated ethylenediamine, or both. If water is added, it is added in an amount to provide a mole ratio of water to zirconium of 1:1 to 20:1. Preferably up to 2 moles of hydroxyalkylated ethylenediamine is added per mole of zirconium.

The cross-linking composition of this invention is useful in oil field applications, for example, for hydraulically fracturing a subterranean formation using the composition. The composition of this invention is further useful for plugging permeable zones or leaks in a subterranean formation. The components of the cross-linking composition may be mixed prior to introducing them into the formation or the components can be introduced and permitted to react in the formation after a controllable period of time.

Surprisingly, in view of known cross-linking compositions comprising zirconium-triethanolamine complexes, the cross-linking composition of this invention has a desirable cross-linking rate of 3-8 minutes and generates good viscosity, preferably in the range of 350 to 1000 centipoise (Cp) after 90 minutes at pH 10 by simulation in a FANN viscometer at 275° F. (135° C.) and 122 rpm at 100 reciprocal second of shear.

DETAILED DESCRIPTION OF THE INVENTION

Trademarks and tradenames are shown herein in upper case.

This invention provides an effective cross-linking agent or cross-linker for use in cross-linking compositions for oil field applications. More specifically, this invention provides a modified zirconium alkanolamine complex having an increased rate of cross-linking while providing high initial viscosity for use in medium to high temperature oil well and high pH environment wells. Addition of certain amounts of ethylene glycol and water to the above zirconium complexes surprisingly increases the rate of cross-linking, allowing more rapid, and often higher initial viscosity development. By varying the level of glycol, the increased rate of cross-linking can be controlled. This discovery is surprising since reaction of ethylene glycol with other cross-linkers has been shown to have no effect or to decrease the rate of cross-linking rather than an increase in rate. For example, U.S. Pat. No. 4,579,670 discloses the use of ethylene glycol as a delay agent, not an accelerator.

The zirconium complex suitable for cross-linking a fracturing fluid is prepared by a process which comprises contacting a zirconium complex with an alkanolamine and ethylene glycol and, optionally water, a hydroxyalkylated ethylenediamine, or both, at a mole ratio of alkanolamine to zirconium of about 2:1 to about 4:1, and a mole ratio of ethylene glycol to zirconium of about 1:1 to about 10:1. The preferred mole ratio of water to zirconium is about 1:1 to about 20:1. Preferably the amount of zirconium in the complex is between about 1% and 15% by weight. Preferably the amount of ethylene glycol relative to the weight of fracturing fluid is below 0.1% by weight.

The contacting step is preferably performed at a temperature of 50° C. to 90° C. and, for a period of time sufficient to stabilize the resulting zirconium complex.

The process may be divided into steps. For example, a zirconium complex may be first contacted with alkanolamine to prepare a zirconium alkanolamine complex, i.e., a solution of triethanolamine zirconate. The triethanolamine zirconate solution may be purchased as TYZOR TEAZ organic zirconate, available from E.I. du Pont de Nemours and Company, Wilmington, Del. The zirconium alkanolamine complex may then be contacted with ethylene glycol and optional water and hydroxyalkylated ethylenediamine.

Alternatively, an alkanolamine zirconate solution may be used in the process and prepared by contacting a solution of a tetraalkyl zirconate in a $C_1$-$C_6$ alcohol with about 2 to about 4 molar equivalents of alkanolamine per mole of zirconium to produce an initial reaction product. Preferably the molar ratio of alkanolamine to zirconium is about 4.

A number of tetraalkyl zirconates (also known as zirconium tetraalkoxides) can be used to prepare the zirconium cross-linking agent in the composition of this invention, e.g., tetra-1-propyl zirconate, tetra-n-propyl zirconate, and tetra-n-butyl zirconate. The preferred tetraalkyl zirconate is tetra-n-propyl zirconate, available as TYZOR NPZ organic zirconate, a solution in n-propanol, with a zirconium content as $ZrO_2$ of about 28% by weight, available from E.I. du Pont de Nemours and Company, Wilmington, Del.

The alkanolamine may be selected from the group consisting of triethanolamine, triisopropanolamine, and tri-n-propanolamine. The preferred alkanolamine is triethanolamine (TEA).

When the zirconium cross-linking agent contains a hydroxyalkylated ethylenediamine, the agent may be prepared by adding a hydroxyalkylated ethylenediamine to an alkanolamine zirconate solution. When a hydroxyalkylated ethylenediamine is used, it is added in an amount up to about 2 molar equivalents, per mole of zirconium. Preferably the hydroxyalkylated ethylene diamine is N,N,N',N'-tetrakis-(2-hydroxypropyl)ethylenediamine, available commercially, for example, from BASF Corporation, Mount Olive, N.J., under the name QUADROL polyol.

When a zirconium alkanolamine complex or zirconium alkanolamine-hydroxyalkylated ethylenediamine complex is prepared, the complex is modified by adding about 1 to about 10 moles of ethylene glycol per mole of zirconium and optionally a small amount of water, and mixing and reacting until a new equilibrium is established. The reaction may be carried out at a temperature of 50° C. to 90° C. A contact time of about 4 hours at 80° C. is adequate, but other periods may be used.

Alternatively, ethylene glycol, zirconium complex, and alkanolamine and optionally hydroxyalkylated ethylenediamine, water, or both are added in any order and reacted. If water is added, it is preferably added after the other ingredients have been mixed to avoid possible precipitation of zirconium hydroxides by reaction with tetraalkyl zirconate.

The cross-linking composition of this invention comprises (a) an aqueous liquid; (b) a pH buffer; (c) a cross-linkable organic polymer; and (d) a zirconium cross-linking agent prepared by a process comprising contacting a zirconium complex with an alkanolamine and ethylene glycol, and optionally one or both of a hydroxyalkylated ethylenediamine and water, wherein the agent has a mole ratio of alkanolamine to zirconium of 2:1 to 4:1, a mole ratio of 1:1 to 10:1 ethylene glycol to zirconium, up to a mole ratio of 2:1 hydroxyalkylated ethylenediamine to zirconium, and optionally a mole ratio of 1:1 to 20:1 water to zirconium.

The aqueous liquid (a) is typically selected from the group consisting of water, aqueous alcohol, and aqueous solution of a clay stabilizer. The alcohol can be the same or different alcohol as the reaction solvent, that is, an alcohol having 1 to 6 carbon atoms. Preferably, when the aqueous liquid is aqueous alcohol, the alcohol is methanol or ethanol. Clay stabilizers include, for example, hydrochloric acid and chloride salts, such as, tetramethylammonium chloride (TMAC) or potassium chloride. Aqueous solutions comprising clay stabilizers may comprise, for example, 0.05 to 0.5 weight % of the stabilizer, based on the combined weight of the aqueous liquid and the organic polymer (i.e., the base gel). Preferably, when the aqueous liquid is an aqueous solution of a clay stabilizer, the clay stabilizer is tetramethylammonium chloride or potassium chloride.

The aqueous liquid can also be a mixture of water and one or more organic solvents. Organic solvents that may be used include alcohols, glycols, polyols, and hydrocarbons such as diesel.

Preferably, the aqueous liquid is water, aqueous methanol, aqueous ethanol, an aqueous solution of potassium chloride, an aqueous solution of tetramethylammonium chloride, or a combination of two or more thereof.

The cross-linking composition comprises an effective amount of a pH buffer (b) to control pH. The pH buffer may be acidic, neutral or basic. The pH buffer is generally capable of controlling the pH from about pH 5 to about pH 12. For example in a composition for use at a pH of 5-7, a fumaric acid-based buffer or a sodium diacetate-based buffer can be used. In a composition for use at a pH of 7-8.5, a sodium bicarbonate-based buffer can be used. In a composition for use at a pH of 9-12, a sodium carbonate or sodium hydroxide-based buffer can be used. The cross-linking composition solution of this invention advantageously comprises a pH buffer for pH 9-12. Other suitable pH buffers can be used, as are known to those skilled in the art.

The composition further comprises a cross-linkable organic polymer (c). Suitable cross-linkable organic polymers are selected from the group consisting of solvatable polysaccharides, polyacrylamides and polymethacrylamides. Preferably the organic polymer is a solvatable polysaccharide and is selected from the group consisting of gums, gum derivatives and cellulose derivatives. Gums include guar gum and locust bean gum, as well as other galactomannan and glucomannan gums, such as those derived from sennas, Brazilwood, tera, honey locust, karaya gum and the like. Preferred gum derivatives include hydroxyethylguar (HEG), hydroxypropylguar (HPG), carboxyethylhydroxyethylguar (CEHEG), carboxymethylhydroxypropylguar (CMHPG), and carboxymethyl guar (CMG). Preferred cellulose derivatives include those containing carboxyl groups, such as carboxymethylcellulose (CMC) and carboxymethylhydroxyethylcellulose (CMHEC). The solvatable polysaccharides can be used individually or in combination; usually, however, a single material is used. Guar derivatives and cellulose derivatives are preferred, such as, HPG, CMC and CMHPG. HPG is generally more preferred based upon its commercial availability and desirable properties. However, CMC and CMHPG may be more preferred in cross-linking compositions when the pH of the composition is less than 6.0 or higher than 9.0, or when the permeability of the formation is such that one wishes to keep the residual solids at a low level to prevent damage to the formation. The cross-linkable polymer is normally mixed with the aqueous liquid to form a base gel.

The zirconium cross-linking agent (d) is prepared by contacting a zirconium complex with an alkanolamine and ethylene glycol, wherein the mole ratio of alkanolamine to zirconium is 2:1 to 4:1, and the mole ratio of ethylene glycol to zirconium is 1:1 to 10:1. Optionally, the zirconium complex is further contacted with water, hydroxyalkylated ethylenediamine, or both, as described previously.

The cross-linking composition may comprise optional components, including those which are common additives for oil field applications. Thus, the composition may further comprise one or more of proppants, friction reducers, bactericides, hydrocarbons, chemical breakers, polymer stabilizers, surfactants, formation control agents, and the like. Proppants include sand, bauxite, glass beads, nylon pellets, aluminum pellets and similar materials. Friction reducers include polyacrylamides. Hydrocarbons include diesel oil. Chemical breakers break the cross-linked polymer (gel) in a controlled manner and include enzymes, alkali metal persulfate, and ammonium persulfate. Polymer stabilizers include methanol, alkali metal thiosulfate, and ammonium thiosulfate.

These optional components are added in an effective amount sufficient to achieve the desired cross-linking performance based on the individual components, desired cross-linking time, temperature and other conditions present in the formation being fractured or permeable zone being plugged.

The cross-linking composition is produced by mixing the zirconium cross-linking agent with the other components, in any order. For example, in one particular application in an oil field, the zirconium cross-linking agent and optional components are introduced into a formation, while the cross-linkable organic polymer and aqueous liquid are introduced into the formation as a separate stream. Alternatively, all components may be premixed and introduced into a subterranean formation as a single stream. Advantageously, the components may be mixed in different combinations, and more advantageously, the components may be mixed just prior to use to enable easy variation and adjustment of the cross-linking rate.

This invention provides a method for hydraulically fracturing a subterranean formation, which comprises introducing into the formation at a flow rate and pressure sufficient to create, reopen, and/or extend one or more fractures in the formation, a cross-linking composition comprising: (a) an aqueous liquid; (b) a pH buffer; (c) a cross-linkable organic polymer; and (d) a zirconium cross-linking agent prepared by a process comprising contacting a zirconium complex with an alkanolamine and ethylene glycol, and optionally one or both of a hydroxyalkylated ethylenediamine and water, wherein the agent has a mole ratio of alkanolamine to zirconium of 2:1 to 4:1, a mole ratio of 1:1 to 10:1 ethylene glycol to zirconium, up to a mole ratio of 2:1 hydroxyalkylated ethylenediamine to zirconium, and optionally a mole ratio of 1:1 to 20:1 water to zirconium. Preferably, the alkanolamine is triethanolamine.

In one embodiment of the method for hydraulically fracturing a subterranean formation, the zirconium cross-linking agent and a base gel are contacted prior to their introduction into the formation, such that the cross-linking agent and polymer react to form a cross-linked gel. The cross-linked gel is then introduced into the formation at a flow rate and pressure sufficient to create, reopen, and/or extend a fracture in the formation. In this method, a base gel is prepared by mixing a cross-linkable organic polymer with an aqueous liquid. The cross-linked gel is prepared by mixing the base gel with a zirconium cross-linking agent prepared by a process comprising contacting a zirconium complex with an alkanolamine and ethylene glycol, and optionally one or both of a hydroxyalkylated ethylenediamine and water, wherein the agent has a mole ratio of alkanolamine to zirconium of 2:1 to 4:1, a mole ratio of 1:1 to 10:1 ethylene glycol to zirconium, up to a mole ratio of 2:1 hydroxyalkylated ethylenediamine to zirconium, and optionally a mole ratio of 1:1 to 20:1 water to zirconium. At least one of the zirconium cross-linking agent and the base gel further comprise a pH buffer.

Alternatively, the subterranean formation may be penetrated by a wellbore, such that contacting the solution of zirconium cross-linking agent with the base gel occurs in the wellbore and the cross-linked gel is introduced into the formation from the wellbore. This method of hydraulically fracturing a subterranean formation penetrated by a wellbore comprises (a) preparing a base gel by mixing a cross-linkable organic polymer with an aqueous liquid; (b) introducing the base gel into the wellbore; (c) simultaneously with, or sequentially after, introducing the base gel into the wellbore, introducing a zirconium cross-linking agent prepared by a process comprising contacting a zirconium complex with an alkanolamine and ethylene glycol, and optionally one or both of a hydroxyalkylated ethylenediamine and water, wherein the agent has a mole ratio of alkanolamine to zirconium of 2:1 to 4:1, a mole ratio of 1:1 to 10:1 ethylene glycol to zirconium, up to a mole ratio of 2:1 hydroxyalkylated ethylenediamine to zirconium, and optionally a mole ratio of 1:1 to 20:1 water to zirconium; (d) permitting the base gel and the solution of zirconium cross-linking agent to react to form a cross-linked aqueous gel; and (e) introducing the cross-linked gel into the formation from the wellbore at a flow rate and pressure sufficient to create, reopen, and/or extend a fracture in the formation. A pH buffer is independently admixed with the base gel, the zirconium cross-linking agent or both prior to introducing the base gel and the zirconium cross-linking agent into the wellbore.

Upon creation of a fracture or fractures, the method may further comprise introducing a cross-linking composition comprising the solution of zirconium complex, a cross-linkable organic polymer and proppant into the fracture or fractures. This second introduction of a solution of zirconium cross-linking agent is preferably performed in the event the cross-linking composition used to create the fracture or fractures did not comprise proppant.

Another use for the zirconium cross-linking agent of the present invention relates to a method for selectively plugging permeable zones and leaks in subterranean formations which comprises introducing into the permeable zone or the site of the subterranean leak, a cross-linking composition comprising (a) an aqueous liquid; (b) a pH buffer; (c) a cross-linkable organic polymer; and (d) a zirconium cross-linking agent prepared by a process comprising contacting a zirconium complex with an alkanolamine and ethylene glycol, and optionally one or both of a hydroxyalkylated ethylenediamine and water, wherein the agent has a mole ratio of alkanolamine to zirconium of 2:1 to 4:1, a mole ratio of 1:1 to 10:1 ethylene glycol to zirconium, up to a mole ratio of 2:1 hydroxyalkylated ethylenediamine to zirconium, and optionally a mole ratio of 1:1 to 20:1 water to zirconium; into the permeable zone or the site of the subterranean leak. The pH buffer may be admixed with the zirconium cross-linking agent prior to introducing the cross-linking composition into the permeable zone or site of the leak.

In a first embodiment of the method for plugging a permeable zone or a leak in a subterranean formation, the aqueous liquid, pH buffer, cross-linkable organic polymer and the zirconium cross-linking agent are contacted prior to their introduction into the subterranean formation, such that the polymer and cross-linking agent react to form a cross-linked aqueous gel, which gel is then introduced into the formation.

In an alternative embodiment of the method for plugging a permeable zone or a leak in a subterranean formation, the zirconium cross-linking agent and the cross-linkable organic polymer are introduced separately, either simultaneously or sequentially, into the permeable zone or the site of the subterranean leak such that cross-linking occurs within the subterranean formation. This method comprises (a) preparing a base gel by mixing a cross-linkable organic polymer with an aqueous liquid; (b) introducing the base gel into the into the permeable zone or the site of the subterranean leak, (d) simultaneously with, or sequentially after, introducing the base gel into the into the permeable zone or the site of the subterranean leak, introducing the zirconium cross-linking agent into the into the permeable zone or the site of the subterranean leak; (e) permitting the base gel and the cross-linking agent to react to form a cross-linked aqueous gel to plug the zone and/or leak. The zirconium cross-linking agent, the base gel, or both further comprise a pH buffer.

The relative amounts of cross-linkable organic polymer and the zirconium cross-linking agent may vary. One uses small but effective amounts which for both will vary with the conditions, e.g., the type of subterranean formation, the depth at which the method (e.g., fluid fracturing, permeable zone plugging or leak plugging) is to be performed, temperature, pH, etc. Generally one uses as small an amount of each component as will provide the viscosity level necessary to effect the desired result, i.e., fracturing of the subterranean formation, or plugging permeable zones or leaks to the extent necessary to promote adequate recovery of oil or gas from the formation.

For example, satisfactory gels can generally be made for fluid fracturing by using the cross-linkable organic polymer in amounts up to about 1.2 weight % and the cross-linking composition in amounts up to about 0.50 weight % of the zirconium cross-linking agent, with percentages being based on the total weight of the base gel. Preferably, from about 0.25 to about 0.75 weight % of the cross-linkable organic polymer is used and from about 0.05 to about 0.25 weight % of the zirconium complex is used.

In a method for plugging permeable zones or leaks, generally about 0.25 to 1.2 weight % of a cross-linkable organic polymer is used, preferably 0.40 to 0.75 weight %, based on the total weight of the base gel. Generally about 0.01 to 0.50 weight % of the zirconium cross-linking agent is used, preferably 0.05 to 0.25 weight %, based on the total weight.

The amount of zirconium cross-linking agent used to cross-link the organic polymer is that which provides a zirconium ion concentration in a range from about 0.0005 weight % to about 0.1 weight %, based on the total weight of the base gel. The preferred concentration of zirconium ion is in the range of from about 0.001-0.05 weight %, based on the total weight.

Typically the zirconium cross-linking agent of this invention can be used at a pH of from about 3 to 11. For low temperature applications (150-250° F., 66-121° C.), carbon dioxide-based energized fluids may be used. In this case, a pH for the cross-linking composition of about 3 to about 6 is preferred. For moderate or high temperature applications (275-400° F., 121-204° C.), a pH of about 9 to about 11 is preferred. Advantageously, the solution of zirconium complex of this invention is used at a temperature of 275-325° F. (135-163° C.) and at a pH 10 or greater. For successful completion of the fracturing operation at a temperature of 250° F. (121° C.), whether hydraulic fracturing or plugging a permeable zone, the cross-linking composition should provide an initial viscosity of at least 650 Cp, preferably at least 750 Cp, and a viscosity of at least 350 Cp, preferably at least 500 Cp, 90 minutes after introducing the cross-linking composition into the subterranean formation or permeable zone or site of a subterranean leak.

EXAMPLES

The preparation of the compositions in the Examples and in the Comparative Examples were each carried out in closed vessels containing an agitator, thermometer, condenser, nitrogen inlet and dropping funnel. Unless specified otherwise, percentages are given by weight. Temperatures are given in degrees Celsius. The cross-linking properties of the compositions of this invention are given in the Examples as a function of the viscosity of carboxymethylhydroxypropylguar cross-linked with the zirconate of this invention.

Preparation of Base Gel

A Waring blender jar was filled with 1 liter of distilled water. To this was added 2 g of a 50% aqueous solution of tetramethylammonium chloride clay stabilizer. Agitation was started and 3.6 g of carboxymethylhydroxypropylguar (CM-HPG) was sprinkled into the vortex of the agitating solution. The pH of the resultant slurry was adjusted to 6 with sodium diacetate and agitation continued for 30 minutes. The pH was then adjusted to 10.3 with 10% sodium hydroxide solution. Agitation was stopped and the gel was allowed to stand for 30 minutes or more before use.

Viscosity Measurement of Zirconate Cross-Linked Base Gel

To 250 ml of a vigorously agitated sample of base gel in a Waring blender jar, was added 0.00032 moles of zirconium (0.2-1.0 ml dependent on percent zirconium of cross-linker solution—hereinafter referred to as the Standard Loading Density). Agitation was continued for about 15-180 seconds. A 25-ml sample of the cross-linker containing gel was placed in the cup of the FANN 50 Viscometer with an R-1, B-3 configuration and viscosity was measured at 275° F. (135° C.) and 122 rpm at 100 reciprocal seconds of shear.

Comparative Example A

A 500-ml flask, equipped with a thermocouple, dropping funnel, N2 bleed and condenser was charged with 59.8 g of 85% lactic acid. Agitation was started and 61.6 g of triethanolamine and 50 g of water were added. The solution was cooled to 15° C. and then 122.5 g of 30% zirconium oxychloride solution were added. The pH was adjusted to 8.0 using 21.7 g of 28% ammonium hydroxide solution. The solution was diluted with 180 g of water to give 495 g of a water white solution containing 3.8% of Zr.

Comparative Example B

A 500-ml flask, equipped with a thermocouple, dropping funnel, N2 bleed and condenser was charged with 100 g of TYZOR NPZ organic zirconate. Agitation was started and a mixture of 67.6 g of triethanolamine and 21 g of water was added. The solution was heated at 80° C. for 4 hours to give 188.6 g of an orange liquid containing 11% of Zr.

Comparative Example C

A 500-ml flask, equipped with a thermocouple, dropping funnel, N2 bleed and condenser was charged with 180 g of TYZOR TEAZ organic zirconate. Agitation was started and 20 g of water were added. The solution was agitated for 4 hours at 80° C. to give 200 g of an orange solution containing 11.9% Zr.

Comparative Example D

A 500-ml flask, equipped with a thermocouple, dropping funnel, N2 bleed and condenser was charged with 313.7 g of TYZOR TEAZ organic zirconate. Agitation was started and 132.6 g of QUADROL polyol were added. The solution was agitated for 2 hours at 60° C. to give 445 g of an orange solution containing 9.3% Zr.

Comparative Example E

A 500-ml flask, equipped with a thermocouple, dropping funnel, N2 bleed and condenser was charged with 100 g of TYZOR NPZ organic zirconate. Agitation was started and 135.2 g of triethanolamine were added. The solution was heated to 60° C. and held at this temperature for 2 hours. Then, 66.2 g of QUADROL polyol were added and the solution was agitated for an additional 2 hours at 60° C. Finally, 10.5 g of water were added and the solution was held at 60° C. for yet another 2 hours to give 304 g of an orange solution containing 6.6% Zr.

Comparative Example F

A 500-ml flask, equipped with a thermocouple, dropping funnel, N2 bleed and condenser was charged with 100 g of TYZOR NPZ organic zirconate. Agitation was started and 135.2 g of triethanolamine were added. The solution was heated to 60° C. and held at this temperature for 2 hours. Then, 66.2 g of QUADROL polyol were added and the solution agitated for an additional 2 hours at 60° C. Finally, 21 g of water was added and the solution was held at 60° C. for yet another 2 hours to give 314 g of an orange solution containing 6.4% Zr.

Example 1

A 500-ml flask, equipped with a thermocouple, dropping funnel, N2 bleed and condenser was charged with 100 g of TYZOR NPZ organic zirconate. Agitation was started and a mixture of 67.6 g of triethanolamine, 14.1 g of ethylene glycol and 21 g of water was added. The solution was heated at 80° C. for 4 hours to give 202 g of an orange liquid containing 10.2% of Zr.

Example 2

A 500-ml flask, equipped with a thermocouple, dropping funnel, N2 bleed and condenser was charged with 100 g of TYZOR NPZ organic zirconate. Agitation was started and a mixture of 67.6 g of triethanolamine, 56.3 g of ethylene glycol and 21 g of water was added. The solution was heated at 80° C. for 4 hours to give 244 g of an orange liquid containing 8.5% of Zr.

Example 3

A 500-ml flask, equipped with a thermocouple, dropping funnel, N2 bleed and condenser was charged with 100 g of TYZOR NPZ organic zirconate. Agitation was started and a mixture of 135.2 g of triethanolamine, 14.1 g of ethylene glycol and 21 g of water was added. The solution was heated at 80° C. for 4 hours to give 270 g of an orange liquid containing 7.7% of Zr.

Example 4

A 500-ml flask, equipped with a thermocouple, dropping funnel, N2 bleed and condenser was charged with 100 g of TYZOR NPZ organic zirconate. Agitation was started and a mixture of 135.2 g of triethanolamine, 56.3 g of ethylene glycol and 21 g of water was added. The solution was heated at 80° C. for 4 hours to give 293 g of an orange liquid containing 6.6% of Zr.

Example 5

A 500-ml flask, equipped with a thermocouple, dropping funnel, N2 bleed and condenser was charged with 156.8 g of TYZOR TEAZ organic zirconate. Agitation was started and a mixture of 66.2 g of QUADROL polyol and 56.3 g of ethylene glycol was added. The solution was agitated for 4 hours at 80° C. to give 279 g of an orange solution containing 7.4% Zr.

Example 6

A 500-ml flask, equipped with a thermocouple, dropping funnel, N2 bleed and condenser was charged with 100 g of TYZOR NPZ organic zirconate. Agitation was started and 135.2 g of triethanolamine were added. The solution was heated to 60° C. and held at this temperature for 2 hours. Then, 66.2 g of QUADROL polyol were added and the solution was agitated for an additional 2 hours at 60° C. Finally, a mixture of 56.2 g of ethylene glycol and 10.5 g of water was added and the solution was held at 60° C. for yet another 2 hours to give 361 g of an orange solution containing 5.6% Zr.

Example 7

A 500-ml flask, equipped with a thermocouple, dropping funnel, N2 bleed and condenser was charged with 100 g of TYZOR NPZ organic zirconate. Agitation was started and 135.2 g of triethanolamine were added. The solution was heated to 60° C. and held at this temperature for 2 hours. Then, 66.2 g of QUADROL polyol were added and the solution was agitated for an additional 2 hours at 60° C. Finally, a mixture of 56.2 g of ethylene glycol and 21 g of water was added and the solution was held at 60° C. for yet another 2 hours to give 371 g of an orange solution containing 5.5% Zr.

Table 1 shows the performance of a CMHPG gel cross-linked with zirconium triethanolamine complexes (Comparative Examples A and B, with varying amounts of ethylene glycol added to Comparative Example B). In this Table, "% Zr" refers to percent of zirconium in the solution of the zirconium cross-linking agent; "Zr, mL" refers to the milliliters of cross-linker solution injected in the test. "TEA" is triethanolamine; "LA" is lactic acid. Notes 1 and 2 refer to additional steps taken for separate runs using Comparative Example B.

"Fann Time at Max Viscosity, min." means the time in minutes it takes to reach maximum viscosity. The viscosity at this maximum time is labeled "Max Viscosity, Cp" to indicate viscosity in centipoise (Cp). The viscosity after 90 minutes at the test temperature of 275° F. (135° C.) is labeled "Viscosity, Cp, at 90 min."

Table 2 uses the same column headings as Table 1, and adds the following: "QUADROL" is tetrahydroxyisopropyl ethylenediamine.

It can be further seen from Table 1, addition of ethylene glycol in amounts of 1% and 10% (134 and 1340 moles per mole of zirconium), delays the rate of cross-linking of zirconium triethanolamine complexes (Comparative Example B) and can dramatically decrease viscosity generation and destabilize viscosity retention. When 1% ethylene glycol is added to Comparative Example B cross-linking rate slows or is decreased (7.5 minutes vs. 5 minutes). When 10% ethylene glycol is added, not only does cross-linking rate further decreased (10 minutes vs. 5 minutes), but the viscosity generation capability and retention is significantly reduced (96 Cp vs. 230 Cp after 90 minutes). Thus, high levels of ethylene glycol are deleterious to the cross-linking compositions of this invention.

Table 2 shows the performance of a CMHPG gel cross-linked with zirconium triethanolamine complexes of the invention in Examples 1-7 and Comparative Examples B-F. As can be seen from Table 2, lower levels of ethylene glycol (1 to 4 moles per mole of zirconium) accelerate the rate of cross-linking of zirconium triethanolamine complexes, as shown by viscosity generation and retention is stabilized

TABLE 1

| Example | % Zr | Zr, ml | Zr, moles | TEA, moles | Ethylene glycol, moles | Alpha-hydroxy acid (moles) | Water, moles | Fann Time at Max Viscosity, min. | Max. Viscosity, Cp | Viscosity, Cp, at 90 min. |
|---|---|---|---|---|---|---|---|---|---|---|
| Comp. A | 3.8 | 0.78 | 1 | 2 | | LA (3) | | 6.5 | 490 | 75 |
| Comp. B | 11 | 0.27 | 1 | 2 | | | 5.12 | 6 | 545 | 230 |
| Comp. B (Note 1) | 11 | 2.5 | 1 | 2 | 134 | | 5.12 | 7.5 | 490 | 325 |
| Comp. B (Note 2) | 11 | 25 | 1 | 2 | 1340 | | 5.12 | 10 | 145 | 96 |

(Note 1): The composition from Comparative Example B was mixed with 1% by weight of ethylene glycol.

(Note 2): The composition from Comparative Example B was mixed with 10% by weight of ethylene glycol.

As can be seen from results in Table 1, an aqueous zirconate cross-linker prepared according to Comparative Example A, as disclosed in U.S. Pat. No. 4,524,829 or 4,460,751, cross-links within the desired 3-8 minute time frame, however, has low initial viscosity and does not retain adequate viscosity (>100 Cp) at 135° C., 275° F., for the desired 90 minutes.

(increased). As shown by Examples 5, 6, and 7, addition of water retards the rate of cross-linking of zirconium triethanolamine complexes in the presence of ethylene glycol. Examples 1-7 show a faster rate of cross-linking than their respective Comparison Examples B-F, and generate higher viscosities, which ensure adequate viscosity retention during the course of the fracturing operation.

TABLE 2

| Example | % Zr | Zr, ml | Zr, moles | TEA, moles | QUADROL, moles | Ethylene Glycol, moles | Water | Fann Time at Max Viscosity, min. | Max. Viscosity, Cp | Viscosity, Cp, at 90 min. |
|---|---|---|---|---|---|---|---|---|---|---|
| Comp. B | 11 | 0.27 | 1 | 2 | | | 5.12 | 6 | 545 | 230 |
| 1 | 10.2 | 0.29 | 1 | 2 | | 1 | 5.12 | 4.5 | 1275 | 690 |
| 2 | 8.5 | 0.35 | 1 | 2 | | 4 | 5.12 | 4 | 1300 | 760 |
| Comp. C | 11.9 | 0.2 | 1 | 4 | | | 5.12 | 8 | 690 | 650 |
| 3 | 7.7 | 0.39 | 1 | 4 | | 1 | 5.12 | 4.5 | 1200 | 725 |
| 4 | 6.6 | 0.45 | 1 | 4 | | 4 | 5.12 | 3.5 | 1675 | 1050 |
| Comp. D | 9.3 | 0.32 | 1 | 4 | 1 | | 0 | 4.5 | 900 | 550 |
| 5 | 7.4 | 0.4 | 1 | 4 | 1 | 4 | 0 | 4 | 1210 | 770 |
| Comp. E | 6.6 | 0.45 | 1 | 4 | 1 | | 2.56 | 12 | 512 | 404 |
| 6 | 5.6 | 0.53 | 1 | 4 | 1 | 4 | 2.56 | 7 | 724 | 455 |
| Comp. F | 6.4 | 0.46 | 1 | 4 | 1 | | 5.12 | 13 | 519 | 321 |
| 7 | 5.5 | 0.54 | 1 | 4 | 1 | 4 | 5.12 | 8 | 696 | 395 |

What is claimed is:

1. A cross-linking composition comprising (a) an aqueous liquid; (b) a pH buffer; (c) a cross-linkable organic polymer; and (d) a zirconium cross-linking agent comprising the product of contacting a solution of a zirconium complex with an alkanolamine and ethylene glycol as an accelerator wherein the mole ratio of alkanolamine to zirconium is 2:1 to 4:1 and the mole ratio of ethylene glycol to zirconium is 1:1 to 10:1 wherein the cross-linking composition has a crosslinking rate in the range of 3-8 minutes, providing an initial viscosity of at least 650 Cp, and a viscosity of at least 350 Cp after 90 minutes, further wherein, if the zirconium complex is contacted with water, water acts as a rate retarder, and water is added in an amount to provide a mole ratio of water to zirconium of 1:1 to 20:1.

2. The composition of claim 1 wherein the zirconium complex is further contacted with water at a mole ratio of water to zirconium of 1:1 to 20:1.

3. The composition of claim 1 or 2 wherein the zirconium complex is further contacted with a hydroxyalkylated ethylenediamine at a mole ratio of greater than 0 up to 2:1 of hydroxyalkylated ethylenediamine to zirconium.

4. The composition of claim 3 wherein the hydroxyalkylated ethylenediamine is N,N,N',N'-tetrakis-(2-hydroxypropyl)ethylenediamine.

5. The composition of claim 1 wherein the alkanolamine is selected from the group consisting of triethanolamine, triisopropanolamine, and tri-n-propanolamine.

6. The composition of claim 5 wherein the alkanolamine is triethanolamine.

7. The composition of claim 1 wherein the zirconium complex is tetra-1-propyl zirconate, tetra-n-propyl zirconate, or tetra-n-butyl zirconate.

8. The composition of claim 7 wherein the zirconium complex is tetra-n-propyl zirconate.

9. The composition of claim 1 wherein the cross-linking composition provides a viscosity in the range of 350 to 1000 Cp after 90 minutes.

10. The composition of claim 1 wherein the cross-linking composition provides an initial viscosity of at least 750 Cp, and a viscosity of at least 500 Cp after 90 minutes.

* * * * *

UNITED STATES PATENT AND TRADEMARK OFFICE
CERTIFICATE OF CORRECTION

PATENT NO. : 8,153,564 B2
APPLICATION NO. : 12/074953
DATED : April 10, 2012
INVENTOR(S) : Donald Edward Putzig Page 1 of 1

It is certified that error appears in the above-identified patent and that said Letters Patent is hereby corrected as shown below:

Column 14, line 28, claim 7, replace "tetra-1-propyl" with --tetra-i-propyl--

Signed and Sealed this
Twenty-ninth Day of May, 2012

David J. Kappos
*Director of the United States Patent and Trademark Office*